United States Patent [19]

Laurent et al.

[11] Patent Number: 5,010,563
[45] Date of Patent: Apr. 23, 1991

[54] SYSTEM FOR THE SUSPENSION OF A ROTATING ANODE OF AN X-RAY TUBE WITH PASSIVE MAGNETIC BEARINGS

[75] Inventors: Michel Laurent, Plaisir; Marc Doukhan, Noisy Le Roi; Pierre Noualhaguet, Issy les Moulineaux, all of France

[73] Assignee: General Electric CGR S.A., Issy les Moulineaux, France

[21] Appl. No.: 406,254

[22] Filed: Sep. 12, 1989

[30] Foreign Application Priority Data

Sep. 23, 1988 [FR] France ................................ 88 12483

[51] Int. Cl.⁵ ............................................. H01J 35/10
[52] U.S. Cl. ........................................ 378/132; 310/71; 310/90; 310/90.5; 384/492; 384/610
[58] Field of Search ........................ 310/90.5, 90, 71; 378/93, 101, 132; 384/492, 610, 277

[56] References Cited

U.S. PATENT DOCUMENTS

| | | | |
|---|---|---|---|
| 3,614,180 | 10/1971 | Beer | 310/90.5 |
| 4,468,801 | 8/1984 | Sudo | 378/132 |
| 4,504,965 | 3/1985 | Ebersberger | 378/132 |
| 4,583,794 | 4/1986 | Takahara | 310/90.5 |
| 4,658,414 | 4/1987 | Geldner | 378/132 |

FOREIGN PATENT DOCUMENTS

| | | |
|---|---|---|
| 0201406 | 12/1986 | European Pat. Off. . |
| 945277 | 7/1956 | Fed. Rep. of Germany . |
| 2231085 | 12/1974 | France . |

OTHER PUBLICATIONS

Patent Abstracts of Japan, vol. 6, No. 95, (E-110) (973), Jun. 3, 1982, K. Kitade, "Rotary Anode X-Ray Tube", Feb. 18, 1982.
Patent Abstracts of Japan, vol. 11, No. 249, (E-532) (2696), Aug. 13, 1987, M. Yamabe, "Rotary Anode For X-Ray Generator", Mar. 17, 1987.
Revue Generale de L'Electricite, No. 10, Oct. 1984, pp. 648–653, Paris, France, T. Redarce et al., "7–L'Utilisation des Aimants Permanents dans la Construction des Paliers Magnetiques".

Primary Examiner—R. Skudy
Attorney, Agent, or Firm—Oblon, Spivak, McClelland, Maier & Neustadt

[57] ABSTRACT

The disclosure concerns rotating-anode type X-ray tubes. According to the disclosure, the rotor is supported by passive magnetic bearings, the respective positions of which are such that the rotor is shifted in the direction opposite to that of the anode. The rotor is kept shifted by a thrust-bearing acts, at the same time, as an electrical conductor for the anode current.

8 Claims, 2 Drawing Sheets

SYSTEM FOR THE SUSPENSION OF A ROTATING ANODE OF AN X-RAY TUBE WITH PASSIVE MAGNETIC BEARINGS

BACKGROUND OF THE INVENTION

1. Field of the Invention

The invention concerns X-ray tubes and, more particularly, a system for the suspension of a rotating anode that has only passive magnetic bearings.

2. Description of the Prior Art

X-ray tubes, for medical diagnosis for example, generally consist (FIG. 2) of a diode, namely with a cathode 21 and an anode 22 or anti-cathode, these two electrodes being enclosed in a vacuum-sealed casing 8 that enables electrical insulation between these two electrodes. The cathode 21 produces an electron beam 23 and the anode 22 receives the electrons on a small area forming a focal spot from which the X-rays are emitted.

When the high supply voltage is applied by a generator 24 to the terminals of the cathode 21 and the anode 22 so that the cathode is at the negative potential (-HT), a so-called anode current is set up in the circuit through the generator 24 producing the high supply voltage. The anode current flows through the space between the cathode and the anode in the form of the beam of electrons 23 which bombard the focal spot.

A small proportion of the energy used to produce the beam of electrons 23 is converted into X-rays while the rest of this energy is converted into heat. Thus, given also the high instantaneous power values (of the order of 100 KW) and the small dimensions of the focal spot (of the order of one millimeter), manufacturers have long been making X-ray tubes with rotating anodes where the anode is made to rotate to distribute the thermal flux on a crown or ring called a focal ring with a far greater area than the focal spot, the interest being all the greater as the rotation speed is high (generally between 3,000 and 12,000 rpm).

The standard type of rotating anode has the general shape of a disk with an axis of symmetry 4 around which it is made to rotate by means of an electrical motor 1. The electrical motor has a stator 2 located outside the casing 8 and a rotor 3 mounted in the casing of the X-ray tube and placed along the axis of symmetry, the rotor being mechanically and solidly joined to the anode by means of a supporting shaft 25.

It is becoming increasingly frequent to use permanently working X-ray tubes. This leads to ever greater levels of dissipated energy. To cool the anode more efficiently, it is made to rotate at ever higher rotation speeds of the order of 10,000 rpm in mechanical type tubes, the rotor of which is mounted on ball bearings. These ball bearings have to work under very difficult conditions, for the temperature is high and the high vacuum of the tube in which they are placed prevents lubrication by a liquid.

Furthermore, a mechanical system of this type generates noise and vibrations that are detrimental to the comfort of the practioner and the patient as well as to the quality of the image obtained.

To overcome the drawbacks of mechanical bearing systems, it has been proposed to use magnetic devices to suspend the rotor/anode set, thus preventing any mechanical friction.

It is recalled that, to maintain a body 30, with a cylindrical shape generated by revolution and an axis $O_1Z$ (FIG. 1), it is necessary to control over 5 degrees of freedom along the axis $O_1X_1$, $O_1Y_1$, $O_2X_2$, $O_2Y_2$ and $O_1Z$, with the body retaining the capacity to rotate around the axis $O_1Z$.

According to Ernshaw's Theorem, it is impossible to obtain complete magnetic levitation of a body, namely without any physical contact, and in a purely passive manner that is, by using only permanent magnets. This is why all hitherto proposed devices with magnetic bearings for the rotation of a rotor/anode set of an X-ray tube, have at least one active channel made with an electromagnet associated with an electronic servo-control circuit positiond along the axis corresponding to this active channel.

This, therefore, leads to the making of a fairly complicated active system to maintain, for example, the position of the rotor along the axis $O_1Z$. To this end, it is necessary to have position detectors. Information on positional deviation, with respect to these detectors, controls the value of the current in the electromagnet so as to reduce this deviation.

An aim of the present invention is to make a system for the suspension of an X-ray tube rotating anode of the type having passive magnetic bearings, wherein the maintaining of the longitudinal position of the rotor along the axis does not require the use of a complicated servo-control system.

SUMMARY OF THE INVENTION

The invention relates to a system for the suspension of an X-ray tube rotating anode having a rotor placed within the tube, one end of which supports the anode and a stator placed at the outside of the tube, wherein said system comprises at least two first magnetized rings fixed to the rotor, and at least two other magnetized rings fixed to the casing of the tube, said rings being positioned with respect to one another so that the rotor can rotate without mechanical friction on an axis of rotation and so that it is axially shifted so as to come into contact with a conductive thrust-bearing placed on the side opposite that of the anode.

BRIEF DESCRIPTION OF THE DRAWINGS

Other features and advantages of the present invention will appear from the following description of a particular exemplary embodiment, said description being made with reference to the appended drawings of which.

DESCRIPTION OF A PREFERRED EMBODIMENT

Figure 1:
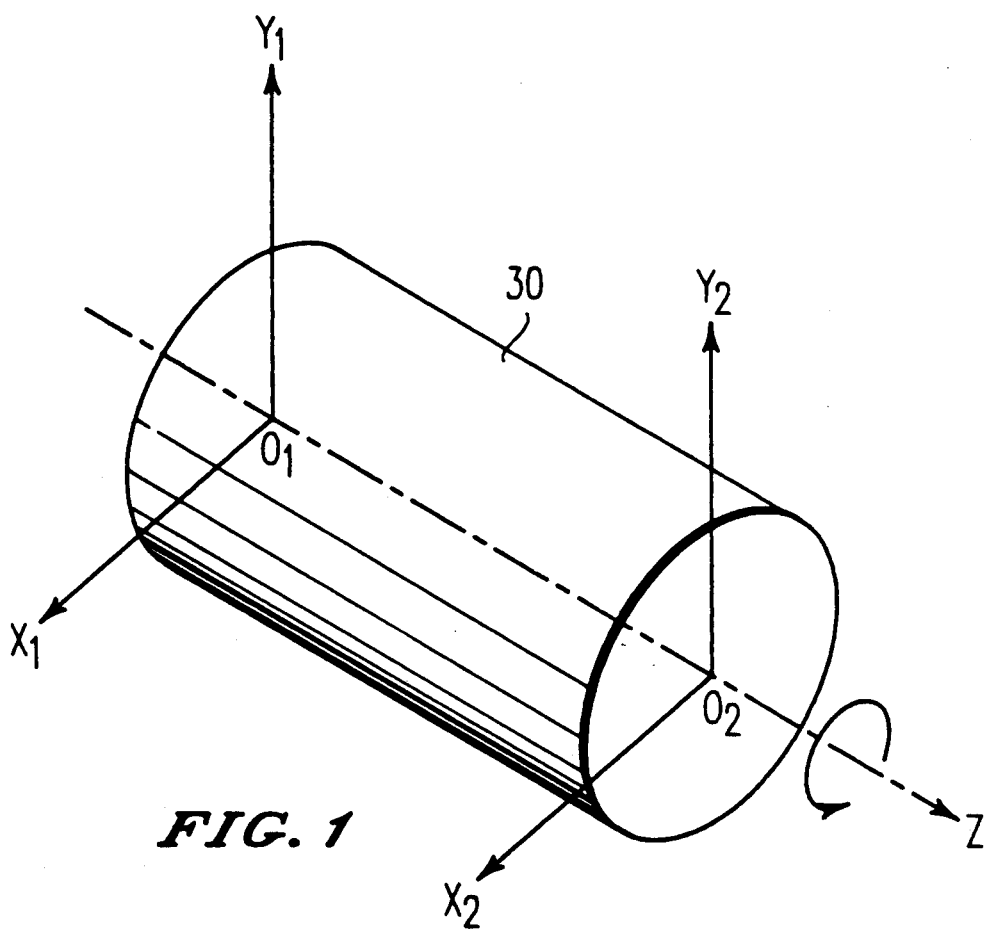
FIG. 1 is a schematic drawing showing the six degrees of freedom of a body.
Figure 2:
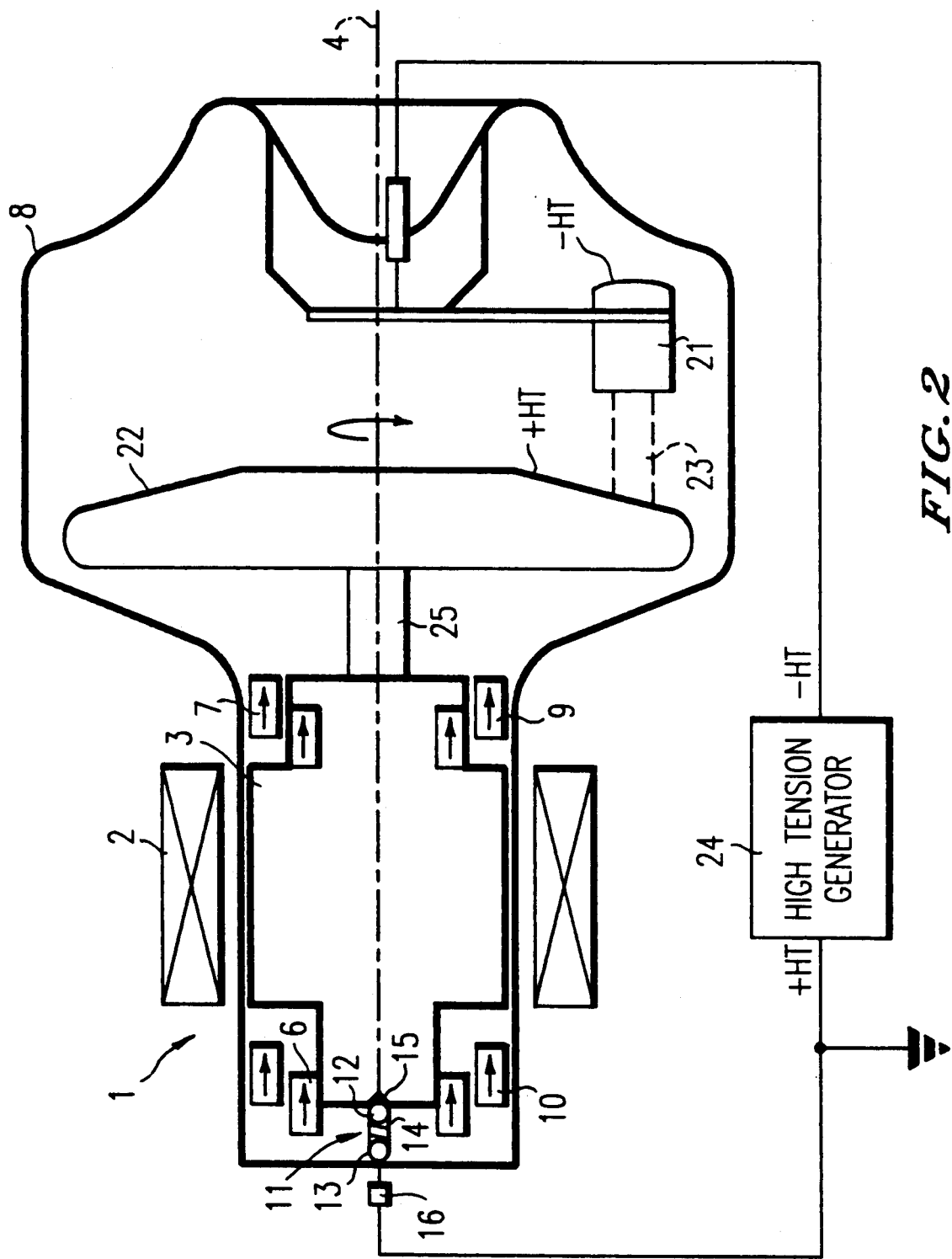
FIG. 2 is a schematic longitudinal sectional view of an X-ray tube having a suspension system, with passive magnetic bearings, according to the present invention.

In FIG. 2, which has already been partially described in the preamble, a motor 1 that drives an anode 22 of the X-ray tube has a rotor 3 which can rotate on an axis of rotation 4. One of the ends of the rotor bears the anode 22 by means of a supporting shaft 25. This rotor 3 is kept in a state of levitation by passive magnets which, in FIG. 2, are four in number. Each end of the rotor 3 has a permanent magnet 5 and 6 which is shaped like an annular crown or ring. The direction of the magnetization is depicted by arrows such as the one marked 7. Each magnet 5 and 6, borne by the rotor 3, works respectively with a permanent magnet 9 and 10, which is fixed, for example, to the internal wall of a casing 8 of the tube. These permanent fixed magnets 9 and 10 also have the shape of an annular crown or ring, and the direction of their magnetization is indicated by the arrows 7. The rotor 3 works together with the stator 2 which is placed outside the casing 8.

It will be easily understood that, with the direction of the magnetizations, a repulsive magnetic force keeps the rings 5 and 6 radially apart from the rings 9 and 10, so that the rotor 3 can rotate on the axis 4 without contact with the magnetic rings 9 and 10. The rings 5, 6, 9 and 10 establish what are called passive magnetic bearings.

With the direction of the magnetizations as indicated in FIG. 2, it is also understood that, in the longitudinal direction along the axis of rotation 4, there is a longitudinal force that tends to make the facing rings escape one another once the planes of these rings no longer coincide exactly. To keep them in coincidence, means are usually provided to detect the longitudinal shift from one side to the other, and to correct it, for example by means of one or more electromagnets.

The present invention does not seek a coincidence such as this but, on the contrary, provides for the shifting of the fixed rings 9 and 10 and of the moving rings 5 and 6 with respect to each other in a determined direction so as to prevent the unstable equilibrium of the central position of coincidence. The direction of this shift is such that the anode 22 approaches the fixed rings 9 and 10. In order to restrict the amplitude of this motion, a thrust-bearing 11 is placed at the end of the rotor opposite to the end bearing the anode 22. This thrust-bearing is also used as an electrical conductor for the anode current. It should therefore have features enabling it to fulfil these two functions. As a thrust-bearing it should be designed to have the minimum friction, so as not to loose the advantages due to the magnetic bearings. As an electrical conductor, its electrical contact with the rotor should be good enough to conduct the anode current while preventing local heating.

The thrust-bearing 11 can be made in different ways along the lines of the following principles. The contact should be achieved along the axis of rotation of the rotor, i.e. at points where the linear speed is almost mile. The nature and geometry of the materials used are chosen so as to restrict wear and tear while enabling good electrical contact and good electrical conduction.

FIG. 2 shows a particular embodiment of a thrust-bearing having two balls 12 and 13 separated by a spring 14. The ball 12 comes into contact with the rotor 3 in a cone-shaped blind hole 15, centered on the axis of rotation 4. The ball 13 is embedded in the bottom of a blind hole which is aligned with the axis of rotation 4. The ball 13 is electrically connected to an output terminal 16 of the anode current which is solidly joined to the casing 8. This blind hole can be made either in the casing 8 or through a support fixed to the casing 8 by any known means. The spring 14 is supported on the two balls 12 and 13, and works in compression.

The elastic system formed by the rotor 3 bearing the anode 22, the magnetic rings 5, 6, 9 and 10 creating an axial repulsive force, and the spring 14 creating an axial force in a direction opposite to that of the repulsive force, has to be adjusted so that the pressure of the spring 14 is minimal when the anode 22 is in the low position. For any other position, the pressure will be greater, and its only drawback will be to increase wear and tear at the contact points between the ball 12 and the rotor 3.

To reduce this wear and tear, it is advantageous to interpose a thin layer of a soft metal between the parts in contact. This layer of a soft metal acts as a solid lubricant and is made, for example, of lead, silver, gold, etc. This layer should not be detrimentel to the quality of electrical contact in any way.

The thrust bearing 11 that has just been described has two balls 12 and 13 associated with a spring 14. This device can be advantageously replaced by a single ball which would be supported, on one side, on the cone-shaped blind hole 15 and, on the other side, on the output terminal 16, solidly joined to the casing 8.

The magnetized rings 5, 6, 9 and 10 are built with materials having magnetic qualities, notably remanent magnetization and coercive field properties, that are as good as possible. This is the case with samarium-cobalt or iron-neodymium-boron alloys. It must be noted that the latter alloy easily gets corroded and oxidated, and that it is therefore important for the rings 9 and 10 to be placed inside the glass casing 8 where a high vacuum prevails.

It must be noted that, for less brittle alloys, the rings 9 and 10 can be placed outside the casing 8. However, in this arrangement, the width of the gap is increased and this is a drawback.

It will be also noted that these magnetic rings are obtained by sintering, and that sintered materials of this type may raise problems during the degassing of the tube to obtain a vacuum of $10^{-8}$ to $10^{-9}$ tor. It is therefore proposed to surround the magnetized rings with a casing made of a non-magnetic material, the thickness of which would be as thin as possible, so as not to increase the gap excessively. A casing of this type could also play a reinforcing role in order to provide for the mechanical holding of the rotating rings 5 and 6, i.e. to prevent them from splitting up in the event of rotation at very high speeds.

The invention has been described by means of a particular exemplary embodiment. However, it can be implemented in different embodiments. Thus, for example, more than four magnetized crowns could be used. It is also possible to use other thrust-bearing devices.

What is claimed is:

1. A system for the suspension of a rotating anode of an X-ray tube which has a rotor rotating on an axis, one end of which supports the anode and a stator placed at the outside of said tube, wherein said system comprises at least two first magnetized rings fixed to the rotor, and at least two other magnetized rings fixed a casing of said tube, said rings being positioned with respect to one another so that said rotor can rotate without mechanical friction around an axis of rotation and so that it is axially shifted so as to come into contact with a thrust-bearing placed on a side opposite that of the anode.

2. A suspension system according to claim 1, wherein the thrust-bearing acts as a conductor of anodic current.

3. A suspension system according to claim 1 or 2, wherein the thrust-bearing has a single ball which is in contact, on one side, with the rotor along the axis of rotation and, on the other side, with an output terminal of the anodic current, that is solidly joined to the casing.

4. A suspension system according to claim 1 or 2, wherein the thrust-bearing includes a first ball in contact with the rotor along the axis of rotation, a second ball in contact with an output terminal of the anodic current and a spring placed between the two balls.

5. A suspension system according to claim 1 or 2, wherein the magnetized rings fixed to the casing of the tube are placed on an internal wall of the casing.

6. A suspension system according to claim 1 or 2, wherein the magnetized rings fixed to the casing of the tube are placed on an external wall of the casing.

7. A suspension system according to claim 1 or 2, wherein the magnetized rings are coated with a casing so as not to hamper the degassing of the tube.

8. A suspension system according to claim 1 or 2, wherein the magnetized rings fixed to the rotor are embedded into a casing.

* * * * *